Aug. 23, 1966  H. H. LOGAN ETAL  3,267,955
HOSPITAL RECOVERY ROOM FACILITY
Filed Oct. 1, 1963  8 Sheets-Sheet 2
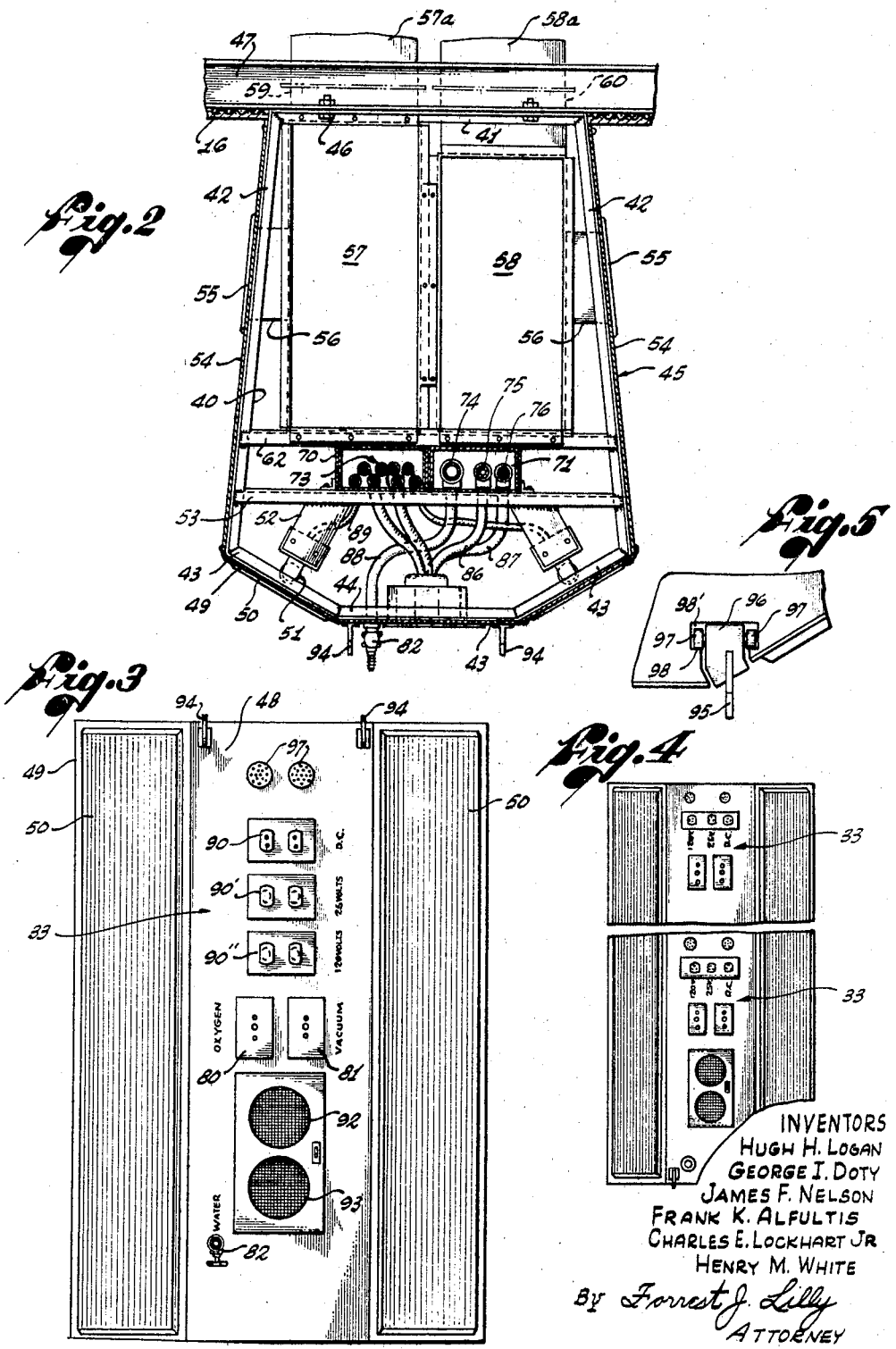
INVENTORS
HUGH H. LOGAN
GEORGE I. DOTY
JAMES F. NELSON
FRANK K. ALFULTIS
CHARLES E. LOCKHART JR
HENRY M. WHITE
By Forrest J. Lilly
ATTORNEY

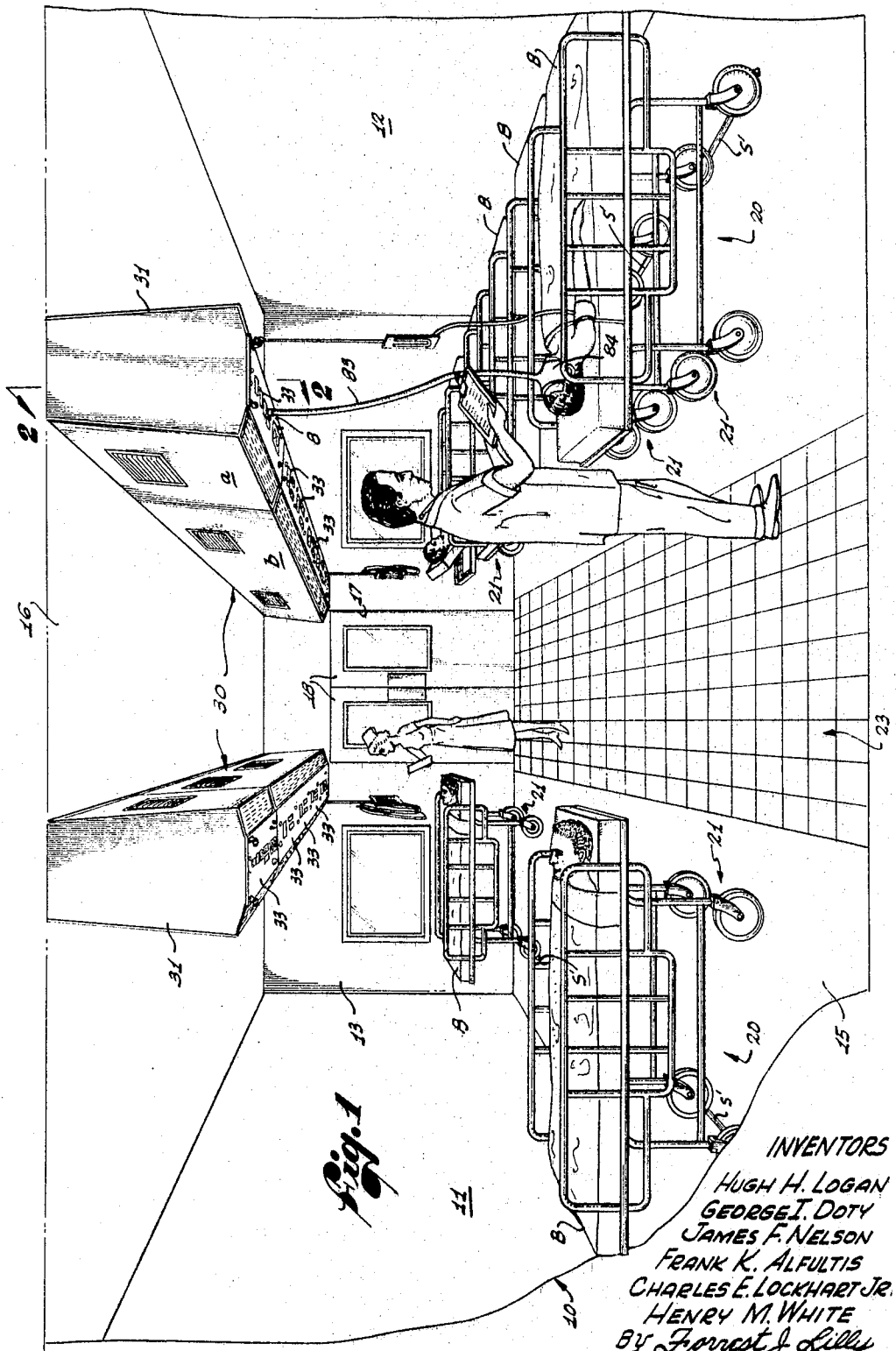

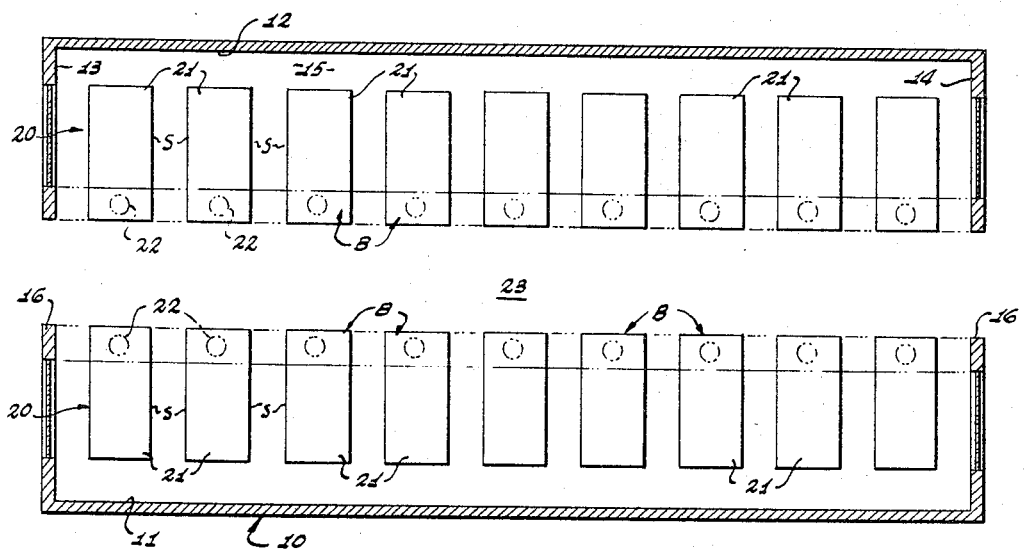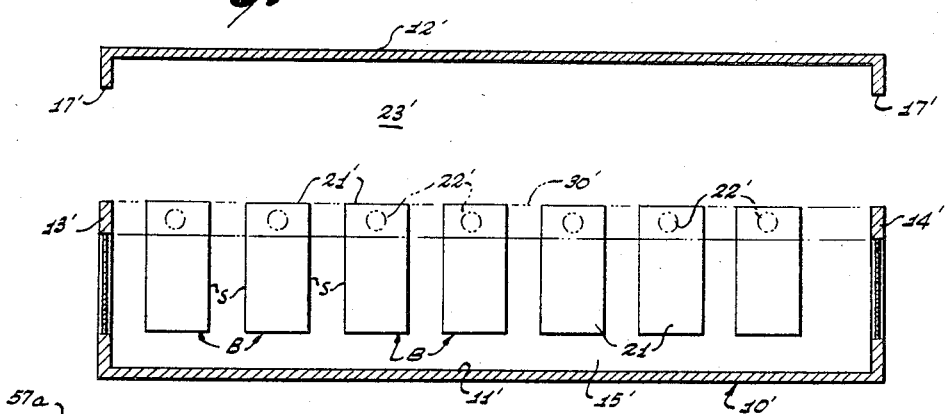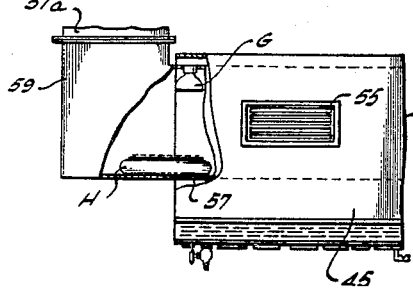

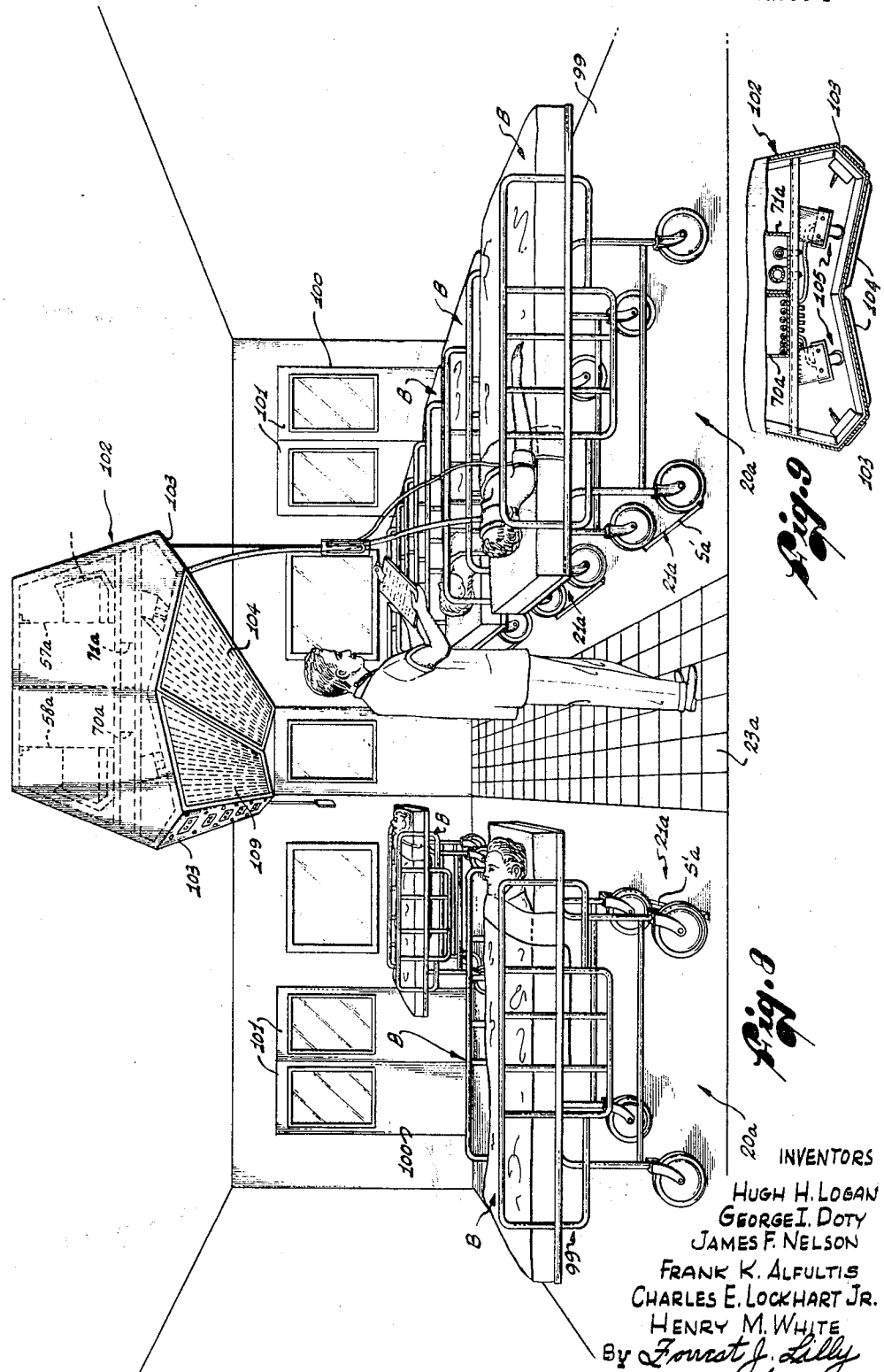

Aug. 23, 1966      H. H. LOGAN ETAL      3,267,955
HOSPITAL RECOVERY ROOM FACILITY
Filed Oct. 1, 1963      8 Sheets-Sheet 5
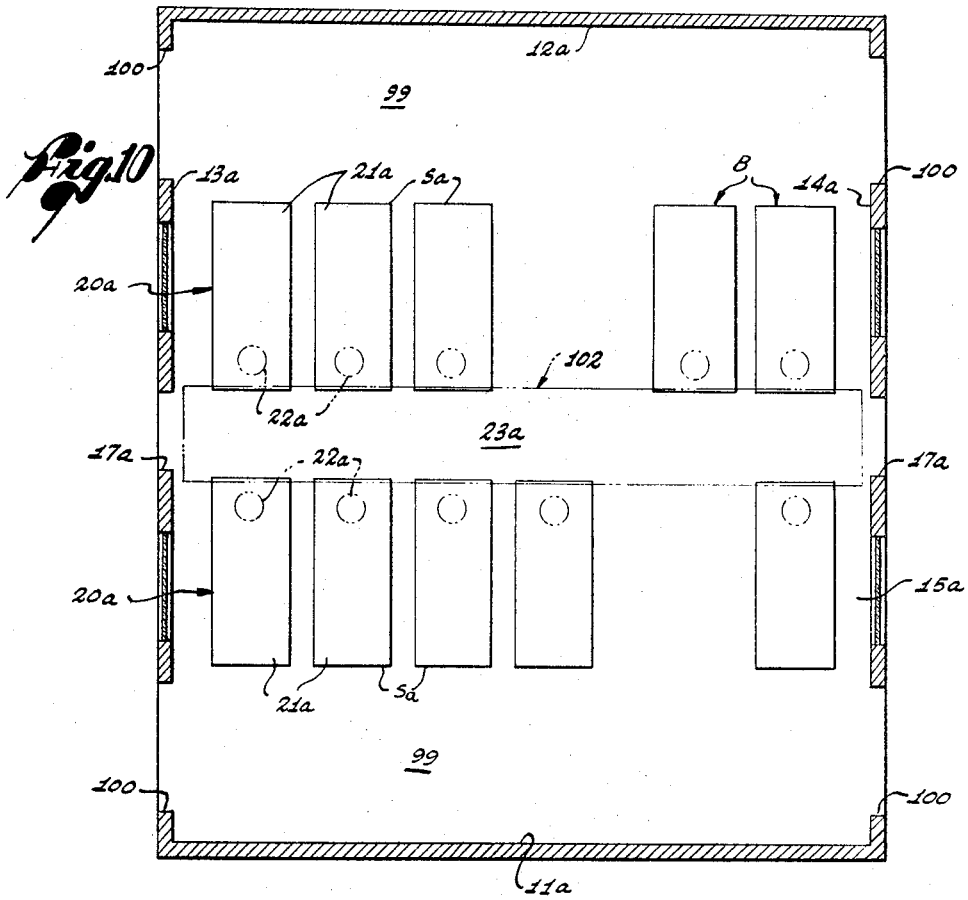
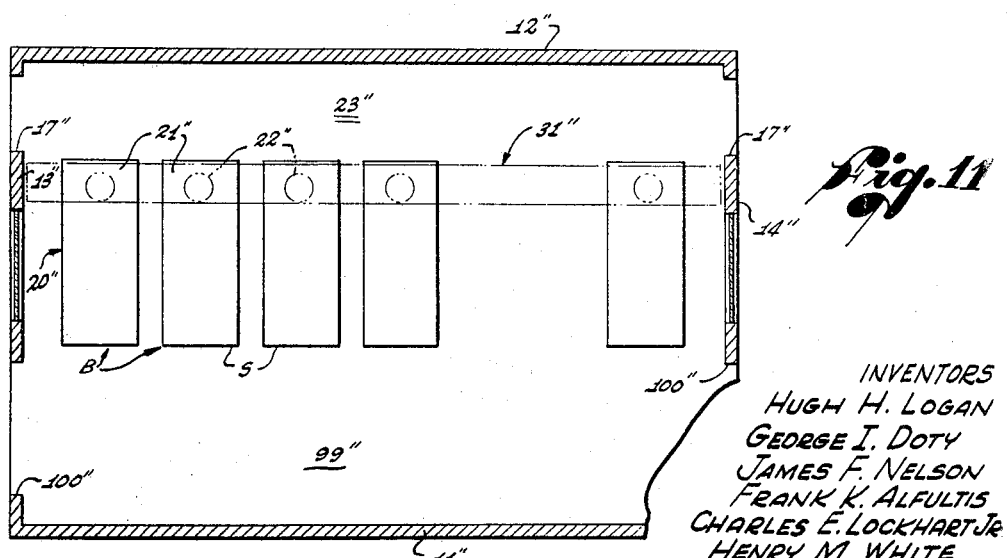
INVENTORS
HUGH H. LOGAN
GEORGE I. DOTY
JAMES F. NELSON
FRANK K. ALFULTIS
CHARLES E. LOCKHART Jr.
HENRY M. WHITE
BY Forrest J. Lilly
ATTORNEY Aug. 23, 1966   H. H. LOGAN ETAL   3,267,955
HOSPITAL RECOVERY ROOM FACILITY
Filed Oct. 1, 1963   8 Sheets-Sheet 6

INVENTORS
HUGH H. LOGAN
GEORGE I. DOTY
JAMES F. NELSON
FRANK K. ALFULTIS
CHARLES E. LOCKHART JR.
HENRY M. WHITE
By Forrest J. Lilly
ATTORNEY Aug. 23, 1966 H. H. LOGAN ETAL 3,267,955
HOSPITAL RECOVERY ROOM FACILITY
Filed Oct. 1, 1963 8 Sheets-Sheet 7
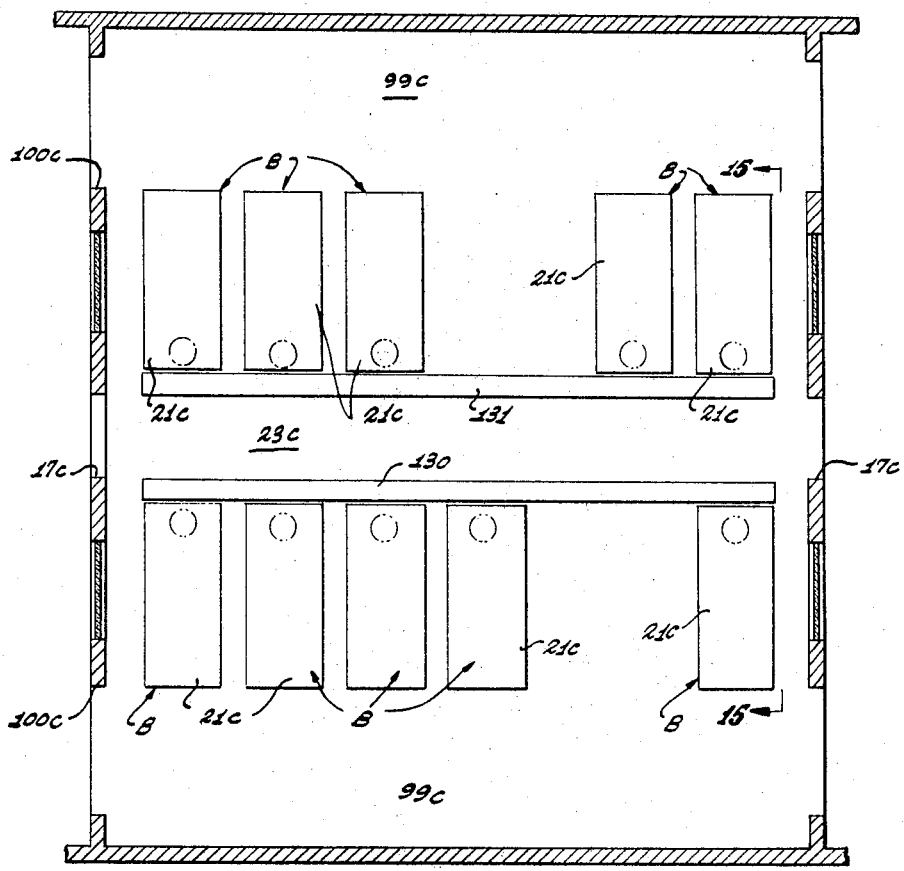
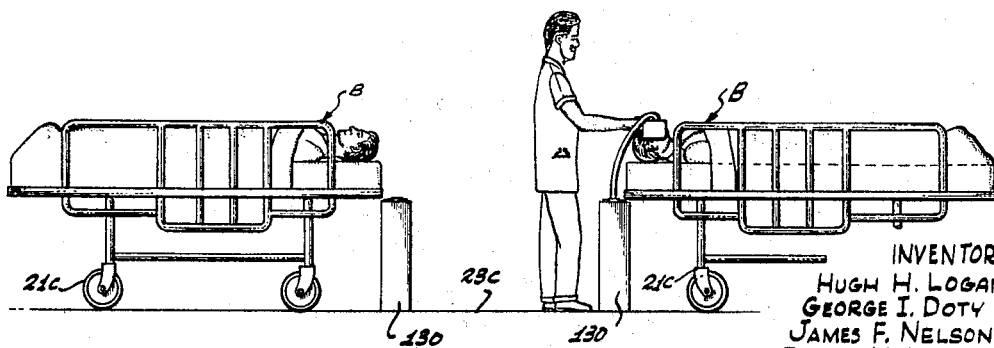
INVENTORS
HUGH H. LOGAN
GEORGE I. DOTY
JAMES F. NELSON
FRANK K. ALFULTIS
CHARLES E. LOCKHART, JR
HENRY M. WHITE
BY Forrest J. Lilly
ATTORNEY Aug. 23, 1966 H. H. LOGAN ETAL 3,267,955
HOSPITAL RECOVERY ROOM FACILITY
Filed Oct. 1, 1963 8 Sheets-Sheet 8

INVENTORS
HUGH H. LOGAN
GEORGE I. DOTY
JAMES F. NELSON
FRANK K. ALFULTIS
CHARLES E. LOCKHART JR
HENRY M. WHITE
By Forrest J. Lilly
ATTORNEY

United States Patent Office 3,267,955
Patented August 23, 1966

3,267,955
HOSPITAL RECOVERY ROOM FACILITY
Hugh H. Logan, Glendale, George I. Doty, La Canada, James F. Nelson, Woodland Hills, Frank K. Alfultis, Sunland, Charles E. Lockhart, Jr., Glendale, and Henry M. White, Woodland Hills, Calif., assignors to Logan Hospital Equipment Co., Glendale, Calif., a corporation of California
Filed Oct. 1, 1963, Ser. No. 312,958
8 Claims. (Cl. 137—357)

This invention relates generally to hospital surgery, recovery and intensive-care rooms and to medical service units and arrangements used therein, and is particularly directed to a new surgery, recovery or intensive-care room facility composed of a novel combination of bed stations, areaway for attendant personnel, and medical service units, conceived to simplify and facilitate the care of or attention to surgical patients or those in need of intensive care.

The invention is herein primarily illustrated and described in its application to a so-called recovery room, but without any implication of limitation thereto, since the invention is also applicable to rooms for patients requiring so-called "intensive care," as well as, in some aspects, to a surgical operating room designed for simultaneous surgery upon a number of patients.

Referring particularly to the illustrative recovery room application, it has become a general practice in modern hospitals to provide a so-called recovery room, wherein numbers of post-operative patients are taken, directly from surgery, for periods of closely supervised care. As mentioned, similar rooms may be provided for non-surgical patients requiring intensive care. The services required may involve administration of oxygen or other gases used in the medical field, application of vacuum for clearance of throat or nasal passages, measurement of blood pressure, electricity for operation of electrical instruments or appliances, etc., as known. In the event the patients may be left unattended, a so-called closed circuit television system may be provided by which each patient may be observed on screens at a remote supervision station. A desirable feature of such rooms is air conditioning thereof, including close regulation of humidity. In this connection, it has recently been reported that certain highly dangerous bacteria, i.e., staphylococci, have been found to be inhibited at a humidity of around 50 percent, and to survive and become considerably more active either below or above the 50 percent range. Air sterilization is another desirable feature of such rooms.

The bed and service equipment arrangements for such rooms have to the present time been the subject of little creative thought. Commonly, the beds are positioned at predetermined stations with their head ends adjacent the walls of the recovery room, with spaces therebetween for access by medical or nursing personnel. Outlets for oxygen, vacuum or the like are commonly arranged at the walls, in predetermined proximity to the bed stations. It has been proposed in the past to arrange a number of beds in a group, with the foot ends proximate to a centrally located nurses' station, at which there is suspended, from the ceiling, a service unit whose equipment, such as oxygen and vacuum lines, may then be extended from this centrally located service unit to the head end of any patient in the bed group. Such an arrangement conveniences the medical attendant or nurse to a degree, in that he or she need move only from the central station through the space between two adjacent beds to reach the patient. This is, of course, an advantage by way of reducing walking distances over the usual arrangement of beds spaced along a wall and their head ends against the wall. The arrangement presents some awkwardness, however, in that only a few beds can be easily included in such a group about a reasonably sized central station area, and the lengths of the hoses or other appliances must be made rather considerable to reach from the central location of the service unit to the head ends of the beds. This last disadvantage, of course, increases rapidly with increase in the number of beds in each group.

In all cases, of course, it is highly desirable that the attendant be able to closely inspect the patients in the room with a minimum of walking distance, be normally as close as may be to the heads of the several patients under care, and that the service unit or equipment be conveniently and simultaneously accessible to each and every patient in the recovery room.

A general object of the invention is to provide a hospital facility of the character described having bed stations, areaways for for personnel and to accommodate bed transportation, and service equipment in a unique combination which conveniences inspection and care of the patients, minimizes walking distance for attendants, minimizes the distance of the heads of the patients from the locations most frequently occupied by the attending personnel, increases the number of patients which can be conveniently supervised by a single attendant, and which locates service unit outlets in positions of new and improved convenience and accessibility to all of the beds in the recovery room.

One typical example embodiment of the invention involves a generally rectangular room with two longitudinal rows of laterally spaced bed stations extending parallel to two opposite side walls of the room, the head ends of the beds of the two rows facing towards rather than away from one another, and these head ends of the beds of the two rows of beds defining a central aisle through the room. In the preferred and usual arrangement, this aisle leads to an access door to the room. The arrangement may also be described by saying that an aisle is provided across the room, leading to an access door, and that two rows of laterally spaced beds are disposed alongside this aisle, with the head ends of the beds adjacent the edges of the aisle. An elongated overhead service unit is suspended from the ceiling, being installed preferably in or on the ceiling, or overhead building structure, in an arrangement paralleling said aisle, and disposed generally over the head ends of the beds or bed stations of one of the described bed rows. A second such elongated service unit may be similarly suspended from the ceiling or overhead building structure, also parallel to the aisle, and disposed generally over the head ends of the beds or bed stations of the other of the two bed rows. In a modified arrangement, the two elongated overhead service units may be merged into a single unit extending above the central aisle defined by the two rows of bed stations, and generally over the head ends of said bed stations. According to a further modification, the overhead service unit or units may be suspended from the ceiling but somewhat spaced therebelow; and in still another modification the service units may be mounted on the floor, along the longitudinal lines of the aisle. A large number of modifications are within the scope of the invention, and a number of these will be mentioned hereinafter.

The service units are equipped with outlet devices for oxygen, vacuum, water, electric power, etc., and an individual group of such outlet accommodations is provided in the service unit or units for each bed station, such that emergency attention or care may be administered simultaneously to all bed stations, if necessary.

A further object of the invention is the provision of an improved service unit, adapted to combine a number of features and functions which are to be carried out for the proper care of the patient. Among these may be mentioned service outlets for oxygen, water, and vacuum, supply lines therefor, lighting equipment for the proper illumination of the patients and surrounding area while care is being administered, closed circuit television equipment by which the patients may be observed from a remote station, ducting for air conditioning of the room, and humidifying and/or dehumidifying equipment in association with such air conditioning ducting, as well as germicidal lighting or radiation combined therewith. It is clear that a large number and variety of such services may be provided for, without the necessity for complete enumeration herein. Broadly, the invention provides the unique advantage that a single installation places in a room, in an especially convenient location, and in an especially compact form, all the necessary facilities for lighting, for supply of medical gases, water, electricity for special instrumentation, air conditioning, including humidity control, air sterilization, closed circuit television, etc. More specifically, the invention makes these provisions in unique combinations wherein the components involved are placed in unique arrangements of great compactness and convenience, leading to the installation, servicing and utilization of the services afforded with high facility.

The invention will be better understood from the following detailed description of several illustrative embodiments of the invention, reference being had to the accompanying drawings, in which:

FIG. 1 is a perspective view of one illustrative hospital facility in accordance with the invention;

FIG. 2 is a transverse section of a service unit in accordance with section line 2—2 of FIG. 1;

FIG. 2a is a fragmentary side elevation of an end portion of a service unit, partly in section;

FIG. 3 is a bottom plan view of the single station service unit module seen in the foreground portion of FIG. 1;

FIG. 4 is a similar view of of the multi-station service unit module seen to the rear of the single station module of FIG. 1;

FIG. 5 is a detailed section of a portion of FIG. 2, showing a modification;

FIG. 6 is a diagrammatic plan view of a room and combination of components in accordance with the invention;

FIG. 7 is a diagrammatic plan view of a modified room and components in accordance with the invention;

FIG. 8 is a perspective view of a facility in accordance with the invention showing a modified service unit;

FIG. 9 is a fragmentary end view, partly in section and partly in elevation, of the service unit of FIG. 8;

FIG. 10 is a diagrammatic plan view of the room of FIG. 8;

FIG. 11 is a diagrammatic plan view of a modified room;

FIG. 14 is a diagrammatic plan view of another modified room and components in accordance with the invention;

FIG. 15 is a view taken as indicated by line 15—15 of FIG. 14;

Figure 12:
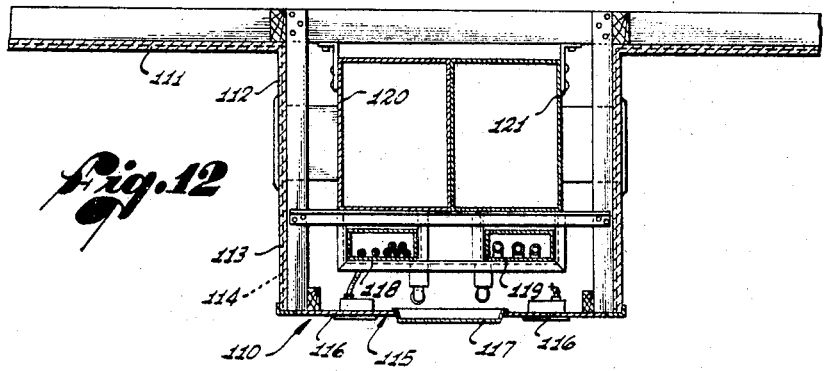
FIG. 12 is a sectional view of a modified service unit.

Reference is first directed to FIGS. 1 and 6, showing one illustrative combination of bed stations, areaway for personnel, and service unit means in accordance with the invention.

Numeral 10 designates a rectangular room, having opposite side walls 11 and 12, opposite end walls 13 and 14, floor 15, and ceiling 16. End walls 13 and 14 preferably have centrally located doorways 17, equipped with pairs of swinging doors 18 (FIG. 1). Along or parallel to each side wall, spaced somewhat therefrom if desired, is a longitudinal row 20 of laterally spaced beds B at predetermined bed stations 21, disposed with the head ends thereof away from the side wall. The head ends of the beds and bed stations are designated by the circle symbols 22 in FIG. 6. The bed stations may be marked on the floor, if desired, as by rectangles S in FIGS. 6, 7, 9 and 10, using any suitable line marking medium. Or, if desired, bumper molding strips such as S' in FIG. 1 may be secured to the floor, to be engaged by the wheels at the foot ends of the beds when the beds are accurately at the bed stations. These provisions, though not essential, usefully mark the bed stations and facilitate location of the beds thereat, in correct alignment with corresponding service outlet stations to be presently described. The beds and bed stations, in the illustrative embodiment here shown, are at right angles to side walls 11 and 12, and the head ends of the beds of the two longitudinal bed rows 20 are spaced to define a central aisle 23 leading between doorways 17. The attending personnel are enabled to confine their patient inspection and care operations primarily to this aisle or areaway 23, thus minimizing the walking that is necessary to reach the heads of patients.

Suspended from ceiling 16, over and parallel to aisle 23, and generally over the head end portions of the beds or bed stations, are elongated overhead service unit means 30. In FIGS. 1 and 6, the service unit means 30 comprises two parallel elongated units 31, located over opposite edge portions of aisle 23, and generally over the head end portions of the corresponding row of bed stations, so that there is close, immediate and convenient accessibility of a service unit to the head end of each bed. Being ceiling supended, these units are sufficiently high to be out of reach of patients shortly out of surgery, for example; but they are low enough for easy reach by attendants.

Directing attention more particularly to the individual serivce units 31, reference is made additionally to FIGS. 2 to 5, inclusive. As indicated in FIG. 1, units 31 may be fabricated in the factory in the form of modules of different lengths, such as a and b, these may be selected and erected end to end to accommodate different room dimensions. The room represented diagrammatically in FIG. 6 has nine bed stations 21 in each longitudinal row 20, and the service units 31 will be fabricated in different lengths such that a plurality of otherwise substantially identical modules may be connected end to end to make up the final full length unit 31. These modules include one or more service outlet stations 33, one generally over and in alignment with the head end region of each bed or bed station, and at each of such service stations, a group of service outlets and facilities for the corresponding bed station is provided. In general, the individual modules may have some differences from one another in addition to length. For example, a special module may be provided with adjustable extension means for final accommodation of the complete unit to a room dimension within which the standard fixed length modules as manufactured do not perfectly fit. Again, some of the modules may be fabricated with special fittings between their interior air conditioning ducting and the ducting of the building.

The particular illustrative facility shown in FIG. 1 is characterized by four bed stations in each longitudinal row. The dimension of the room from end wall to end wall may be assumed to be 16 feet, capable of accommodating four beds of the type used in the recovery room. The service units 31 may then be 16 feet in length, and, as here indicated, comprise a short four foot module a, with a single service station 33 having a group of outlet facilities for one bed station, and a 12 foot module b, with three serially repeated service stations 33, having three groups of outlet facilities for three corresponding bed stations. These will be understood as mounted in end-to-end abutment, and interconnected with any suitable means, not shown.

Each service unit module, as shown in FIGS. 1–5, has two or more longitudinally spaced, transverse, welded angle-iron frames 40, including a top piece 41, two outwardly angling side pieces 42 depending from the ends of top piece 41, two short angle pieces 43 extending inwardly and somewhat downwardly from the lower ends of side pieces 42, and a bottom piece 44 joining the inner ends of angle pieces 43.

A sheet metal housing 45 fits around these frames, excepting for the tops thereof, being fastened to the frame members 42 to 44 by suitable screws. The service unit may be mounted adjacent or suspended from the ceiling of the room as by means of bolts 46 passing through the flanges of angle members 41 and the flanges or overhead beams such as 47 incorporated in the overhead building structure adjacent the ceiling.

The bottom housing wall 48 serves as a service outlet panel for a plurality of service outlets to provide the aforementioned service station 33. A typical group of such outlets will be described in more particular hereinafter.

The angle housing walls 49, overlying frame pieces 43, are apertured and formed to receive and support diffused light transmission glass panels 50, behind which are lighting means of any desired type, preferably fluorescent tubes 51 carried by usual brackets on more or less conventional housing 52 which, as here shown, are supported by being welded to horizontal transverse frame straps 53 extending across frames 40.

The main side housing walls 54 are provided with air conditioning louvers 55, which lead via short ducts 56 to two side-by-side longitudinal air conditioning ducts 57 and 58 located within the service unit and running longitudinally therein. One duct, as 57, carries air conditioned supply air, to be discharged into the room via the corresponding louver, and the other duct 58 is a return duct to carry away used air taken in via its corresponding louver 55. The ducts 57 and 58 will be understood to join one another from module to module, and may be connected at their joints in any desired or conventional manner. The ducts 57 and 58 of one module of an installation, usually an end module, are formed with upwardly extending communication ducts such as 59 and 60 (FIGS. 2 and 2a) for coupling to supply and return air conditioning ducts of the buiding, indicated fragmentarily at 57a and 58a in FIG. 2. As shown in FIG. 2a, the left-hand end of the housing wall 45 will be understood to abut the plaster of the end wall of the room. The ducts 57 and 58 connect to communication ducts 59 and 60 which will be understood to extend, for example, through the end wall of the room, and to connect to upwardly extending building conduits 57a and 58a. The ducts 57 and 58 are supported in and by frames 40 in any suitable manner. As here shown, they are vertically supported on horizontal transverse angle irons 62 extending across frames 40 a few inches above frame member 53.

Mounted on transverse frame members 53, between the latter and frame members 62, are two ducts 70 and 71, the former for electrical wiring, as indicated generally at 73, and the latter for a water supply pipe 74, an oxygen supply pipe 75, and a vacuum line 76. These ducts 70 and 71 and the wiring and piping therein lead longitudinally through the service unit, i.e., through the one or more modules thereof, with suitable joints or connections being provided between modules as may be required. At some place along the assembly of modules, preferably at one end thereof, supply wiring and piping permanently installed into the building structure is connected to the wiring and piping contained in the ducts 70 and 71. Since such arrangements are obvious and may be readily supplied by those skilled in the art, no separate illustration is deemed necessary herein. It might here be mentioned that the service units may be installed for the full distance between the opposite end walls of the room, or may be spaced somewhat from the end wall, at either or both ends. If so spaced, the service unit is provided with a suitable end wall, as indicated at 78 in FIG. 1. Preferably, at least the end of the service unit through which wiring and piping connections are made to supply wiring and piping of the building is abutted against the adjacent wall, as indicated in FIG. 1, and in such case, no end wall is needed at the end of the unit so abutting the room wall. There is, of course, no need for end walls at the junctures of successive modules.

Referring now to FIG. 3, conventional plug-in oxygen and vacuum outlets are represented at 80 and 81, respectively, and a water tap at 82. It will be understood that an oxygen hose 83, leading, for example, to a breathing mask 84, has at its end a suitable plug which is adapted for quick attachment to and detachment from oxygen outlet 80. Similarly, a hose (not illustrated) with a mouth tube at one end and a plug at the other is adapted for similar connection with vacuum outlet 81. The oxygen and vacuum outlets 80 and 81 are connected above bottom wall or panel 48 with oxygen and vacuum pipes 75 and 77 by means of feeders 86 and 87, respectively. Similarly, water tap 82 is connected with water pipe 74 by means of feeder 88.

The fluorescent lighting units are fed with electrical conductors leading from duct 70, as indicated at 89. Other conductors within duct 70 carry electrical current at different voltages and with alternating as well as direct current to energize corresponding outlet receptacles such as 90, 90′ and 90″. These are provided to accommodate plugs on the ends of supply cords leading to various kinds of electrical instrumentation requiring different types of voltage supply, and variations and additions may, of course, be provided as desired. The duct 70 may also carry wiring for a closed circuit television system, with television cameras (not shown) mounted in the service unit in positions to view the patients. The panel 48 is also shown as provided with multiple socket receptacles 91, which may receive plugs on the ends of suitable cords to plug into any type of electrical instrument which may be accommodated within the service unit. Finally, a loudspeaker 92 and a microphone 93 are shown as located side by side in panel 48, and the wiring from these units is also carried by duct 70. It will be clear that additional service outlets may be provided in any desired number and variety.

The various service outlets will be seen to be located in a convenient overhead position, and the angled light panels 50 afford good room illumination.

The outlets, connections, etc., shown in FIG. 3 are for a single station or a one-module unit. In the case of plural station modules, such as module b of FIG. 1, the outlets, connections, etc., may simply be serially repeated, though in this case, some facilities may be omitted at some stations. For example, there is ordinarily no need for a repetition of the loud-speaker equipment.

The service units may also be provided with overhead suspension means for various instruments or for liquids for intravenous injection, such as the hooks indicated at 94 in FIG. 2. In FIG. 5, we have shown a modification which can be incorporated in the structure of FIGS. 1–4. A hook 95 is here suspended from a body 96 equipped with wheels 97 running on tracks 98 afforded with a longitudinal passage 98′ formed in the service unit. This passage 98′ may be continued from module to module by suitable arrangement of the end frames of abutting modules therearound. An instrument, such as a sphygmomanometer, may be conveniently suspended from such a running support.

A humidifier H is shown in FIG. 2a to be placed in the air conditioning intake duct. Preferably, the air supplied by the system will be dried to an extent somewhat below required humidity. The humidifier H is then set or regulated to maintain desired humidity, as 50 percent. A germicidal lamp G is also shown in FIG. 2a, within the air conditioning intake duct, in position to sterilize incoming air.

It will be evident from the foregoing that there has been provided a service unit combining in a unique and especially compact and convenient interrelationship a plurality of components required for advanced patient care in a hospital recovery or intensive-care room. These have been spatially and structurally combined and interrelated for internal as well as overall compactness, simplicity of construction, minimized cost of fabrication, and convenience for the technicians using the equipment. The room facility as a whole, including the service unit, will be seen to afford a degree of convenience for technical personnel that has heretofore been unapproached. Walking between beds for ordinary patient inspection and care has been virtually eliminated, and the technical personnel can confine themselves to the central aisle, moving from patient to patient with a minimum of steps and a maximum of efficiency. All service unit facilities as well as all patients are always immediately at hand from the location of this central aisle. At the same time, the physical room arrangement of the invention affords these conveniences while at the same time being consistent with the use therein of a comparatively large number of bed stations along the aisle. The efficiency made possible by the facility is so marked that the number of patients cared for per attendant can be markedly increased without increase in the actual or effective work load.

For a small recovery room, of a comparatively small number of beds, or when the hospital floor plan cannot accommodate a recovery room of the width necessary for the preferred arrangement of FIGS. 1–6, the modification of FIG. 7 affords many of the benefits of the invention. Here, the rectangular room 10' has opposite side walls 11' and 12', oposite end walls 13' and 14', a floor 15', and a ceiling, not shown. Along just a single side wall, wall 11' in this case, is a row 20' of laterally spaced beds or bed stations 21', disposed with the head ends thereof away from the wall, as represented symbolically at 22'. The head ends of the beds or bed stations, together with the room side wall 12', define the working areaway or aisle 23' for technical personnel. As shown, the room is provided with doorways 17' at the ends of aisle 23'. A single overhead service unit 31', understood to be like one of the units 31 of the earlier embodiment, for example, with one service panel outlet station for each bed station, is mounted parallel to aisle 23', generally over the head ends of the row of bed stations 21'.

FIGS. 8 and 10 are views similar to FIGS. 1 and 6, respectively. The room is similar in general respects to that of FIGS. 1 and 6, and the same reference numerals, but with the suffix "a" added, are accordingly applied, and a repeated description of similar parts of the room will not be required. A significant difference is shown, in that the room is somewhat wider than that of FIG. 1, so that the foot ends of the beds are spaced from the side walls to provide rectangular areaways 99; and wide doorways 100 with double doors 101 are afforded in end walls 13a, near the corners of the room, opposite the ends of these areaways 99. Thus the beds may be wheeled to or from the predetermined bed stations over the areaways 99 and through the doors 101, without passing through the central aisle or areaway 23a where medical personnel may be busy. The door 18a may be a single door in this case, and the aisle 23a may be correspondingly narrower. To aid in demarking the bed stations, rectangles Sa may be marked on the floor (FIG. 10), or bumper molding strips S'a (FIG. 8) may be secured to the floor, to be engaged by the wheels at the head ends of the beds when the beds are at the bed stations.

A further significant difference in the room of FIGS. 8 and 10 is that a single service unit 102 is used, being suspended from the ceiling parallel to aisle 23a, and directly over the aisle, with its longitudinal sides generally over the longitudinal borders of the aisles and the corresponding head end regions of the beds 21a.

In this case, the service unit 102 has two service outlet panels 103 along the lower longitudinal outer edge portions thereof, disposed at a convenient angle, as shown, and each provided with a plurality of service outlet stations, one for each corresponding bed station. Each outlet service station has a group of service outlets, of the kind disclosed in FIGS. 1–5. Between these are a pair of glass illumination panels 104, disposed at a shallow inward angle to one another, and these may be of translucent character, e.g., translucent glass, with incandescent or fluorescent lighting units 105 therebehind, as represented in FIG. 9. The service unit 102 may otherwise be made up as the units 30 heretofore described, and will contain electrical and pipe ducts 70a and 71a, as represented in FIG. 9, and air conditioning ducts 57a and 58a, along with appropriate louvers, as indicated in FIG. 9.

FIG. 11 shows a modification of the single bed-row room of FIG. 7, incorporating the corner door location feature of FIGS. 8 and 10. The room is shown to have side walls 11" and 12", end walls 13" and 14", a single row 20" of laterally spaced beds or predetermined bed stations 21", parallel to walls 11" and 12", and spaced from wall 12" by personnel-working aisle or areaway 23," and from wall 11" by areaway 99". At opposite ends of aisle 23" are doorways 17", and at opposite ends of rectangular areaway 99" are wider doors or doorways 100", in a corner location, near side wall 11". The doors 100" are of a width to easily accommodate passage of a bed. The head ends of the beds, symbolized at 22", face along and define the aisle 23". An overhead service unit 31", suspended from the ceiling, runs parallel to aisle 23", generally over the head ends of the beds. Unit 31" may be like the units 31 of FIG. 1–5, with one service outlet station for each bed station, as earlier described. The areaway 99" and the corner doors 100" permit movement of beds into or from the bed station positions in the room without crossing the working aisle 23".

FIG. 12 shows a modified ceiling-suspended service unit 110, according to which the plaster ceiling 111 is furred down, as at 112, to define opposite outer walls 113 of the unit 110. Suitable interior lath or the like is indicated at 114, to serve as a base for the plaster, and suitable framing may be provided, as is well within the skill of the building art and need not be detailed herein. The open bottom of the structure as thus described is closed by a bottom panel 115, provided, in this case, with two series of repeated service outlet stations 116, and an intervening glass panel 117. Ducts for wiring and service fluid pipes are shown at 118 and 119, respectively, and intake and return air conditioning ducts at 120 and 121, respectively. Suitable support means for these ducts may be provided, for instance, as illustrated. The service unit as thus described will be understood to be elongated in a direction perpendicular to the paper in FIG. 12, and to have two series of service outlets spaced therealong, as well as louvers for the air conditioning ducts, and other features as in the earlier figures.

Figure 13:
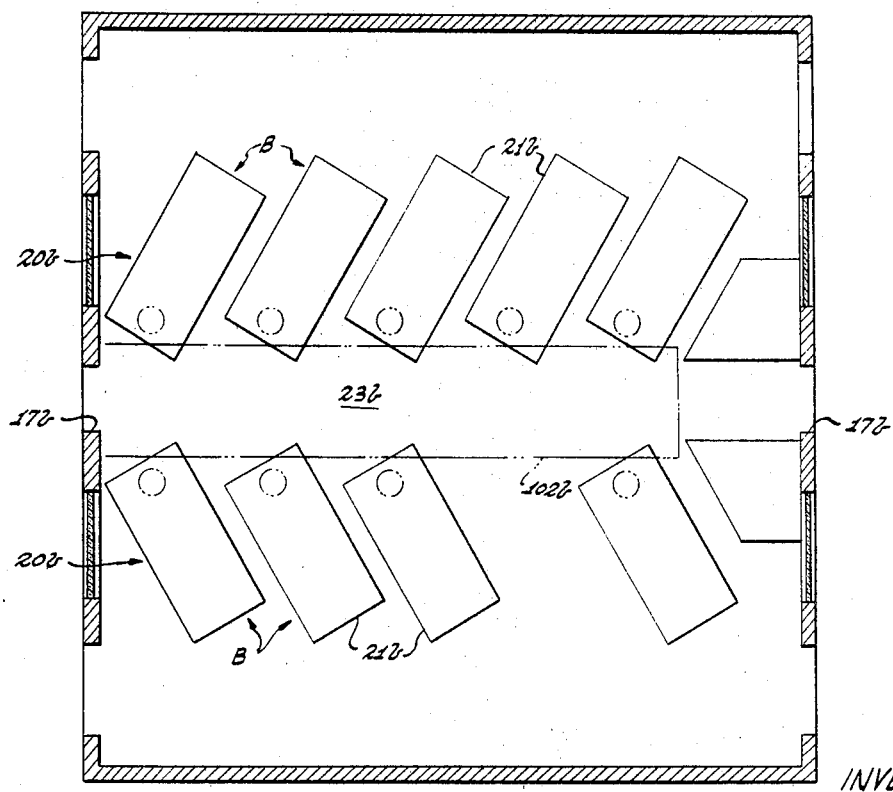
FIG. 13 is a diagrammatic plan view of a modified room and components in accordance with the invention.

FIG. 13 is a floor plan for a recovery room facility similar to that depicted in FIG. 10, but with the laterally spaced beds or bed stations of the two longitudinal rows thereof disposed at a substantial acute angle to the aisle to facilitate movement of a bed into or from position. The room is similar in most general respects to that of FIG. 10, and the same refenerce numerals, but with the "b" used in FIG. 10, are accordingly applied, and a detailed description of similar features need not be repeated. In FIG. 13, the room is narrower than that of FIG. 10, so that the areaways 99b are not as wide as the areaways 99 of FIG. 13. By placing the bed stations 21b (and beds B) at an acute angle, as illustrated, the beds can easily be wheeled to and from position within the confines of the narrow areaways 99b. The bed stations can be marked or indicated in any suitable way, as described above, or will be indicated and predetermined by the service outlet stations on the service unit 102b.

Figure 16:
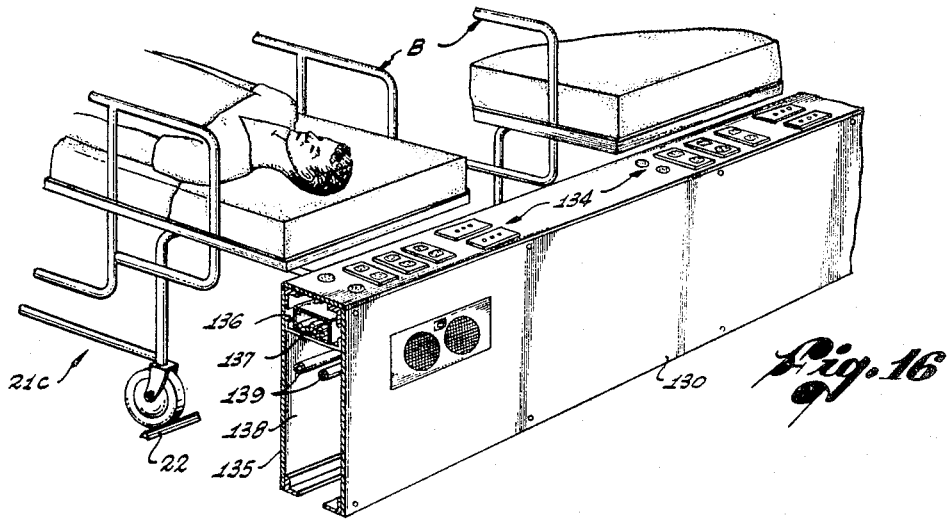
FIG. 16 is a perspective view of a portion of the modification of FIGS. 14 and 15.

FIGS. 14–16 show a recovery or intensive-care room facility similar in general respects to that of FIGS. 8 and 10, the principal difference being that the service units are mounted on the floor instead of being suspended from the ceiling. Components of the embodiment of FIGS. 14–16 corresponding to those of FIGS. 8 and 10 are identified by like reference numerals, but with the suffix "c" used in the case of FIGS. 14–16. A description of components already described in connection with FIGS. 8 and 10 will not be necessary for the embodiment of FIGS. 14–16.

In FIGS. 14–16, two service units 130 and 131 extend across the room, defining aisle 23c which extends between doors 17c. These service units are adjacent to the head ends of laterally spaced beds B, positioned at laterally spaced bed stations 21c marked, for example, by bed wheel bumper strips such as indicated at 132 in FIG. 16. The bed stations 21c are also pre-located and determined by the locations of service outlet stations, indicated at 134 in FIG. 16, in the tops of service unit 130.

As here shown, each service unit comprises a horizontally elongated, upright rectangular housing 135, containing a duct 136 for electrical wiring 137, a compartment 138 for fluid lines 139, and including service facilities as typically shown and described in connection with earlier embodiments of the invention, with the exception that provisions for air conditioning and room lighting are here omitted. In this case, the beds obviously cannot be wheeled across the service units to the doors 17c, and the areaways 99c and doors 100c are used for moving the beds to and from the room and the bed stations therein.

According to the description generally given above, the head ends of the beds or bed stations of the longitudinal rows thereof define the central aisle 23c, and the service outlet stations of the service unit or units are positioned generally in alignment with the head ends of the beds or bed stations. It is equally apt to say that the aisle is laid out across the floor, and the elongated unit or units installed along and in parallelism therewith, with the service outlet stations spaced longitudinally along the latter. The service station locations and the aisle then determine the locations of the beds or bed stations, which, in accordance with the invention, are laterally spaced from one another, in correspondence with the spacings between service outlet stations, and arranged in longitudinal rows along the aisle, with the head ends thereof nearest the aisle. The bed stations are thus, in this view, generally predetermined or demarked by the locations of the aisle and the service outlet stations.

Figure 17:
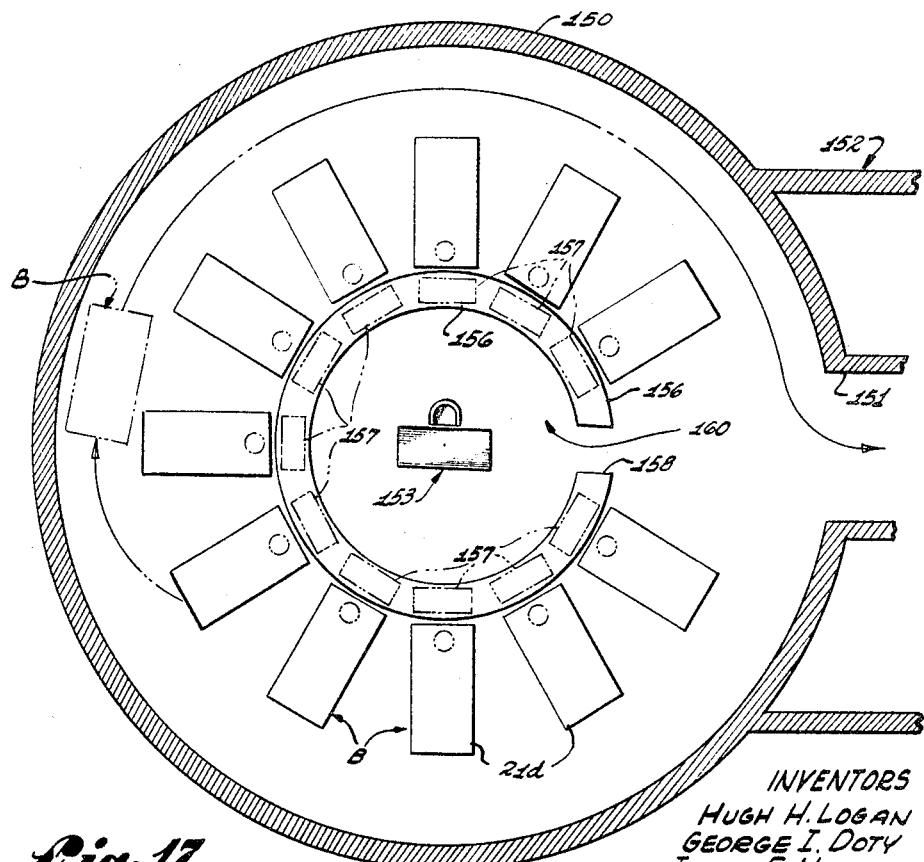
FIG. 17 is a plan view of another modification of the invention.

FIG. 17 is a plan view of a modified recovery or intensive-care facility in accordance with the broad invention, the room in this instance being of circular form, and the bed stations being radially disposed to the center of the circle. A circular room wall 150 has a doorway 151. The room may be at the end of a wing 152 of the hospital building. At the center of the room has been represented a nurses' desk and chair group 153. On radii of the circular room are spaced bed stations 21d, at which are located beds B, with the head ends thereof toward the center of the circle, as represented. The beds B in this case are again laterally spaced from one another, and are effectively in a row which has been turned into a circle. Opposite the door 151, the bed stations are given a somewhat wider spacing, to afford a good area wherein the beds may be maneuvered while being moved into or from the room.

The service unit, designated in this instance by reference numeral 156, is elongated, formed into a circle, and positioned so as to extend past the head ends of the circularly arranged row of beds. The service unit may be mounted overhead, and be ceiling suspended, as in the case of FIGS. 1–5, for example; or may be mounted on the floor, as in FIGS. 14–16. FIG. 17, a plan view, is illustrative of both variants. In the event of ceiling suspension, the circular service unit could evidently be somewhat larger in diameter than as here shown, so as to actually overhang at least portions of the head ends of the beds. In the case of ceiling suspension, and disposed as illustrated in FIG. 17, however, it may be described generally as suspended over the head end regions of the beds or bed stations. Also, if ceiling suspended, the service unit may be made up, for example, as illustrated in FIG. 2, or in FIG. 12, and will be understood to have, if desired, all the equipment and facilities illustratively described in connection with said figures, including fluid and vacuum lines, electric lighting, electric wiring, air conditioning, humidity regulation, air sterilization, etc. Service outlet stations 157 are provided in line with respective bed stations 21d, and serve to determine or mark the locations of the latter. In this case, the outlets of each service station are on the lower portion or underside of the service unit, as in FIG. 2.

In the case of a circular room such as FIG. 17, but with the circular service unit 156 mounted on the floor (instead of the ceiling), in the fashion illustrated in FIG. 16, the service unit crosses the head ends of the beds at the bed stations, in close proximity thereto, as represented in FIG. 17 (see also FIG. 16), and the service outlet stations, in this case in the top of the service unit, as in FIG. 16, determine and mark the bed stations, the head ends of which, of course, are again adjacent the service unit. In the event of floor mounting of the service unit, it is formed in line with doorway 151 with a gap or passage 158 for personnel. The floor-mounted service unit may be equipped with facilities as illustrated and described in connection with FIG. 16.

The circular areaway 160 radially inside the bed stations, and inside the circular service unit in case of floor mounting of the latter, is for nursing and attendant personnel, and corresponds to the aisle-type areaways of the earlier described embodiments. The aisle of the earlier embodiments may, in fact, be considered to have been turned into a circle for the purpose of the embodiment of FIG. 17, and attendants walking in this area, along the head ends of the bed stations, pass successive beds and may inspect successive patients in the same way and with the same minimized walking distance as is the case with the embodiments of the invention discussed earlier. The system of FIG. 17 has the added advantage that a single attendant seated at 153 can easily maintain general surveillance over the entire group of bed occupants.

It will be evident from the foregoing description that we have provided a hospital facility which greatly eases and conveniences the temporary care of post-operative patients or patients in need of intensive care in hospitals, and which greatly reduces both time and motion on the part of the attendant physician, or nursing and technical personnel, permitting fewer attendants to take better care of a larger number of patients. The service units per se have been conceived and constructed to fulfill a number of functions required either coincidentally or sequentially, in an arrangement and relative position of new and improved compactness and convenience. Attention has been given to both simplicity and compactness, and consequent low cost, and at the same time to fulfilment within a single unit of all mechanical, electrical and air conditioning and sterilization functions such as may be required in a recovery room or the like of a modern, first-class hospital. It is only required that a room of suitable dimensions be made available. The installation of a factory prefabricated service unit or units in accordance with the invention then completes the room, affording lighting, plumbing, air conditioning, and service outlets for oxygen, vacuum, water, electrical current in various forms and voltages, loud-speaker equipment, etc. Alternatively, the service unit may be built in, as suggested in FIG. 12. To our knowledge, the convenience and efficiency afforded by the invention have not heretofore been remotely approached.

It will be understood that the drawings and description are by way of example only and that various changes in design, structure and arrangement are possible without departing from the spirit and scope of the disclosed invention.

We claim:

1. A hospital facility comprising a room with walls, a floor and a ceiling, a doorway in a wall of said room, there being an areaway for attendant personnel on a portion of the floor of said room, including a walkway connected with said doorway, a row of beds disposed with the head ends thereof generally along a line bordering said areaway, and service means in said room comprising horizontally elongated housing means extending generally along said line, a series of repeated groups of service outlets in and spaced longitudinally along said housing, one proximate to the head end of each of said beds, duct means extending longitudinally through said housing means, and supply means in said duct means having feeder branches leading and connected to said outlets.

2. A facility as defined in claim 1 wherein said service means is mounted on said floor between said head ends of said beds and said areaway.

3. A facility as defined in claim 1 wherein said areaway comprises an aisle, there being two of said rows of beds, and on each side of said aisle, there being two of said elongated service means, one for each row of beds.

4. A facility as defined in claim 1 wherein said areaway comprises an aisle, there being two of said rows of beds, one on each side of said aisle, said service means comprising a single housing suspended from said ceiling over said aisle and having two laterally spaced rows of said repeated groups of service outlets.

5. A facility as defined in claim 1 wherein said areaway for attendant personnel is generally in the form of a circle, said beds being positioned outside said circle, with the head ends thereof disposed along a generally circular line adjacent the perimeter of said circle.

6. A facility as defined in claim 5 wherein said service means is suspended from said ceiling.

7. A facility as defined in claim 5 wherein said service means is mounted on said floor, between the heads of said beds and said areaway, and is arranged in a generally circular configuration conforming substantially to the perimeter of said circle.

8. A hospital facility comprising a room with walls, a floor and a ceiling, a doorway in a wall of said room, there being an areaway for attendant personnel on a portion of the floor of said room, including a walkway connected with said doorway, a row of beds disposed with the head ends thereof generally along a line bordering said areaway, and service means in said room comprising horizontally elongated housing means extending across the ceiling generally along said line, a series of repeated groups of service outlets in and spaced longitudinally along said housing in the lower portion thereof, one proximate to the head end of each of said beds, duct means extending longitudinally through said housing means, and supply means in said duct means having feeder branches leading and connected to said outlets.

References Cited by the Examiner
UNITED STATES PATENTS

| 1,718,252 | 6/1929 | Putnam | 52—220 |
| 3,032,057 | 5/1962 | Mays | 128—172 |

MEYER PERLIN, *Primary Examiner.*